US008896585B2

(12) United States Patent
Yoo et al.

(10) Patent No.: US 8,896,585 B2
(45) Date of Patent: Nov. 25, 2014

(54) DISPLAY DEVICE AND DRIVING METHOD THEREOF

(75) Inventors: Myoung-Hwan Yoo, Yongin (KR); Choon-Yul Oh, Yongin (KR)

(73) Assignee: Samsung Display Co., Ltd., Yongin, Gyeonggi-Do (KR)

( * ) Notice: Subject to any disclaimer, the term of this patent is extended or adjusted under 35 U.S.C. 154(b) by 350 days.

(21) Appl. No.: 12/929,802

(22) Filed: Feb. 16, 2011

(65) Prior Publication Data

US 2011/0205206 A1 Aug. 25, 2011

(30) Foreign Application Priority Data

Feb. 19, 2010 (KR) ........................ 10-2010-0015379

(51) Int. Cl.
*G06F 3/038* (2013.01)
*G09G 5/00* (2006.01)
*G09G 3/32* (2006.01)

(52) U.S. Cl.
CPC ........ *G09G 3/3275* (2013.01); *G09G 2300/043* (2013.01); *G09G 2320/043* (2013.01); *G09G 2320/0295* (2013.01); *G09G 2300/0861* (2013.01)
USPC ........... 345/211; 345/212; 345/213; 345/214; 345/215

(58) Field of Classification Search
USPC .................... 345/76–83, 211–215; 315/169.3
See application file for complete search history.

(56) References Cited

U.S. PATENT DOCUMENTS 7,978,159 B2 * 7/2011 Kim et al. ....................... 345/77
2003/0030603 A1 * 2/2003 Shimoda ......................... 345/76
2004/0233141 A1 * 11/2004 Matsumoto ..................... 345/76
2007/0008253 A1 * 1/2007 Nathan et al. ................... 345/76
2007/0120780 A1 * 5/2007 Park et al. ....................... 345/76
2008/0074362 A1 * 3/2008 Ogura ............................ 345/77
2008/0180365 A1 * 7/2008 Ozaki ............................ 345/76
2008/0218450 A1 * 9/2008 Park ............................... 345/76
2008/0246785 A1 * 10/2008 Shirasaki et al. ............. 345/690
2009/0051628 A1 * 2/2009 Kwon ............................ 345/77
2009/0096493 A1 * 4/2009 Nagumo ....................... 327/109
2009/0213049 A1 8/2009 McCreary
2009/0303227 A1 * 12/2009 Hwang ......................... 345/214

FOREIGN PATENT DOCUMENTS

EP 1 879 171 A1 1/2008
JP 2006-301250 A 11/2006
JP 2007-156430 A 6/2007
JP 2007-206139 A 8/2007
JP 2008-191247 A 8/2008
JP 2008-216872 A 9/2008
KR 10 2004-0045352 A 6/2004

(Continued)

*Primary Examiner* — Joe H Cheng
*Assistant Examiner* — Michael J Jansen, II
(74) *Attorney, Agent, or Firm* — Lee & Morse, P.C.

(57) ABSTRACT

A display device includes a display unit including a plurality of scan lines, a plurality of data lines to which a plurality of compensation data signals are transmitted, a plurality of light emitting signal lines, and a plurality of pixels respectively connected to the plurality of scan lines, the plurality of data lines, and the plurality of light emitting signal lines, and a data driver generating a data voltage corresponding to a image data signal, and converting the data voltage to the compensation data signal. The data driver includes a compensator generating the compensation data signal in accordance with a feedback voltage. The feedback voltage is determined by a degree of deterioration associated with each pixel, and increases with an increasing deterioration degree of the pixel.

7 Claims, 5 Drawing Sheets

(56) References Cited

FOREIGN PATENT DOCUMENTS

| | | | |
|---|---|---|---|
| KR | 10 2005-0068229 | A | 7/2005 |
| KR | 10 2005-0068841 | A | 7/2005 |
| KR | 10 2005-0084636 | A | 8/2005 |
| KR | 10-0858615 | B1 | 9/2008 |
| KR | 10 2009-0057484 | A | 6/2009 |

* cited by examiner

DISPLAY DEVICE AND DRIVING METHOD THEREOF

BACKGROUND

1. Field

Embodiments relate to a display device and a driving method thereof. More particularly, embodiments relate to an organic light emitting diode (OLED) display and a driving method thereof.

2. Description of the Related Art

A display device includes a display panel formed of a plurality of pixels arranged in a matrix format. A display panel may include a plurality of scan lines formed in a row direction and a plurality of data lines formed in a column line. The plurality of scan lines and the plurality of data lines are arranged to cross each other. Each of the plurality of pixels is driven by a scan signal and a data signal transmitted from respectively corresponding scan and data lines.

The display device is classified into a passive matrix (PM) light emitting display device and an active matrix (AM) light emitting display device depending on the method of driving the pixels. In view of resolution, contrast, and response time, the trend is towards the AM display devices in which respective unit pixels are selectively turned on or off.

The display device is used as a display unit for a personal computer, a portable phone, a PDA, and other mobile information devices, or as a monitor for various kinds of information systems. A liquid crystal panel-based LCD, an organic light emitting diode (OLED) display, a plasma panel-based PDP, etc., are well known. Various kinds of emissive display devices, which have lower weight and volume than CRTs, have been recently developed. Particularly, organic light emitting diode (OLED) displays have come to the forefront, due to their excellent emissive efficiency, luminance, and viewing angle, and short response time.

Each pixel of the OLED display includes an OLED and a driving transistor for driving the OLED. However, the current flowing in the OLED is changed due to changes in the threshold voltage of the driving transistor. In order to solve this problem, the threshold voltage of the driving transistor is calculated to compensate a data voltage with the calculated threshold voltage. However, the threshold voltage cannot be accurately calculated, resulting in inconsistent luminance of the OLED.

The above information disclosed in this Background section is only for enhancement of understanding of the background of the invention and therefore it may contain information that does not form the prior art that is already known in this country to a person of ordinary skill in the art.

SUMMARY

Embodiments are therefore directed to a display device and driving method thereof, which substantially overcome one or more of the problems due to the limitations and disadvantages of the related art.

It is therefore a feature of an embodiment to provide a display device that can constantly maintain luminance of an organic light emitting diode, and a driving method thereof.

A display device according to an exemplary embodiment includes a display unit and a data driver. The display unit includes a plurality of scan lines to which a plurality of scan signals are transmitted, a plurality of data lines to which a plurality of compensation data signals are transmitted, a plurality of light emitting signal lines to which a plurality of light emitting signals are transmitted, and a plurality of pixels respectively connected to the plurality of scan lines, the plurality of data lines, and the plurality of light emitting signal lines. The data driver generates a data voltage corresponding to an image data signal, and converting the data voltage to the compensation data signal. The data driver includes a compensator configured to generate an additive voltage by adding a predetermined first power source voltage to the data voltage, receive a feedback voltage corresponding to a threshold voltage of a driving transistor of each pixel according to a compensation control signal generated by synchronization with the scan signal, and generate a difference between the additive voltage and the feedback voltage as the compensation data signal.

The compensator may include an additive voltage generator configured to generate the additive voltage by adding the data voltage and the first power source voltage, a compensation data voltage generator configured to generate the compensation data signal by performing subtraction between the additive voltage and the feedback voltage, a first switch transmitting the feedback voltage to the compensation data voltage generator according to the compensation control signal; and a second switch transmitting the compensation data signal to the pixel according to a load signal that instructs transmission of the compensation data signal to the plurality of data lines. The compensation data voltage generator may include a non-inversion terminal receiving the additive voltage, an inversion terminal receiving the feedback voltage, and an output terminal connected to the data line.

Each of the plurality of pixels may includes a switch transistor having a source terminal connected to the data line and a gate line connected to the scan line, a driving transistor having a source terminal receiving the first power source voltage and a gate terminal connected to a drain terminal of the switching transistor, a capacitor having a first end connected to the source terminal of the driving transistor and a second end connected between the gate terminals of the driving transistor, a light emission control transistor having a gate terminal connected to the light emitting signal line and a source terminal connected to the drain of the driving transistor, an organic light emitting diode (OLED) having an anode connected to the drain terminal of the light emission control transistor and a cathode receiving a second power source voltage, and a threshold voltage compensation transistor having a gate terminal receiving the compensation control signal, a drain terminal connected to the drain terminal of the driving transistor, and a source terminal connected to the source terminal of the switching transistor.

A driving method according to another exemplary embodiment is provided to a display device including a plurality of scan lines to which a plurality of scan signals are transmitted, a plurality of data lines to which a plurality of compensation data signals are transmitted, a plurality of light emitting signal lines to which a plurality of light emitting signals are transmitted, and a plurality of pixels respectively connected to the plurality of scan lines, the plurality of data lines, and the plurality of light emitting signal lines. The driving method includes generating a data voltage corresponding to an image data signal, generating an additive voltage by adding a predetermined power source voltage to the data voltage, receiving a feedback voltage corresponding to a threshold voltage of a driving transistor of each of the plurality of pixels according to a compensation control signal generated by synchronization with the scan signal, and generating a difference between the additive voltage and the feedback voltage and transmitting the difference as a compensation data signal to the plurality of data lines. The feedback voltage may equal a difference between the power source voltage and the threshold voltage of the driving transistor.

A display device according to another exemplary embodiment includes a display unit and a data driver. The display unit includes a plurality of scan lines to which a plurality of scan signals are transmitted, a plurality of data lines to which a plurality of compensation data signals are transmitted, a plurality of light emitting signal lines to which a plurality of light emitting signals are transmitted, and a plurality of pixels respectively connected to the plurality of scan lines, the plurality of data lines, and the plurality of light emitting signal lines. The data driver is configured to generate a data voltage corresponding to an image data signal and converts the data voltage to the compensation data signal. The data driver includes a compensator configured to detect a feedback voltage corresponding to the degree of deterioration of the pixel according to a compensation control signal generated from the scan signal with a predetermined phase delay and to compensate the data voltage by calculating the variation amount of the feedback voltage.

Each of the plurality of pixels may include a switching transistor having a source terminal connected to the data line and a gate terminal connected to the scan line, a driving transistor having a source terminal receiving a first power source voltage and a gate terminal connected to a drain terminal of the switching transistor, a capacitor having a first end connected to the source terminal of the driving transistor and a second end connected between the gate terminal of the driving transistor, a light emission control transistor having a gate terminal connected to the light emitting signal line and a source terminal connected to the drain terminal of the driving transistor; an organic light emitting diode (OLED) having an anode connected to the drain terminal of the light emission control transistor and a cathode receiving a second power source voltage, and a threshold voltage compensation transistor having a gate terminal receiving the compensation control signal, a drain terminal connected to the drain terminal of the driving transistor, and a source terminal connected to the source terminal of the switching transistor.

The compensator may include a deterioration detector detecting a voltage at both ends of the organic light emitting diode as the feedback voltage according to the compensation control signal, and a compensation data voltage generator configured to calculate the variation amount of the feedback voltage and generate the compensation data signal by compensating the data voltage by the amount of the calculated feedback voltage.

The compensator may further include a switch transmitting the compensation data signal to the pixel according to a load signal that instructs transmission of the compensation data signal to the plurality of data lines. The deterioration detector may include an analog digital converter transmitting the feedback voltage to the compensation data voltage generator, and a switch transmitting the feedback voltage to the analog digital converter according to the compensation control signal.

A driving method according to another exemplary embodiment is a provided to a display device including a plurality of scan lines to which a plurality of scan signals are transmitted, a plurality of data lines to which a plurality of compensation data signals are transmitted, a plurality of light emitting signal lines to which a plurality of light emitting signals are transmitted, and a plurality of pixels respectively connected to the plurality of scan lines, the plurality of data lines, and the plurality of light emitting signal lines. The driving method includes generating a data voltage corresponding to an image data signal, detecting a feedback voltage corresponding to the degree of deterioration of the pixel according to a compensation control signal generated from the scan signal with a predetermined phase delay, and compensating the data voltage by calculating the variation amount of the feedback voltage.

Detecting the feedback voltage may include applying the data voltage to each of the plurality of pixels, transmitting a current corresponding to the data voltage to an organic light emitting diode according to the light emission control signal, and generating a voltage at both ends of the organic light emitting diode with the feedback voltage.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Figure 1:
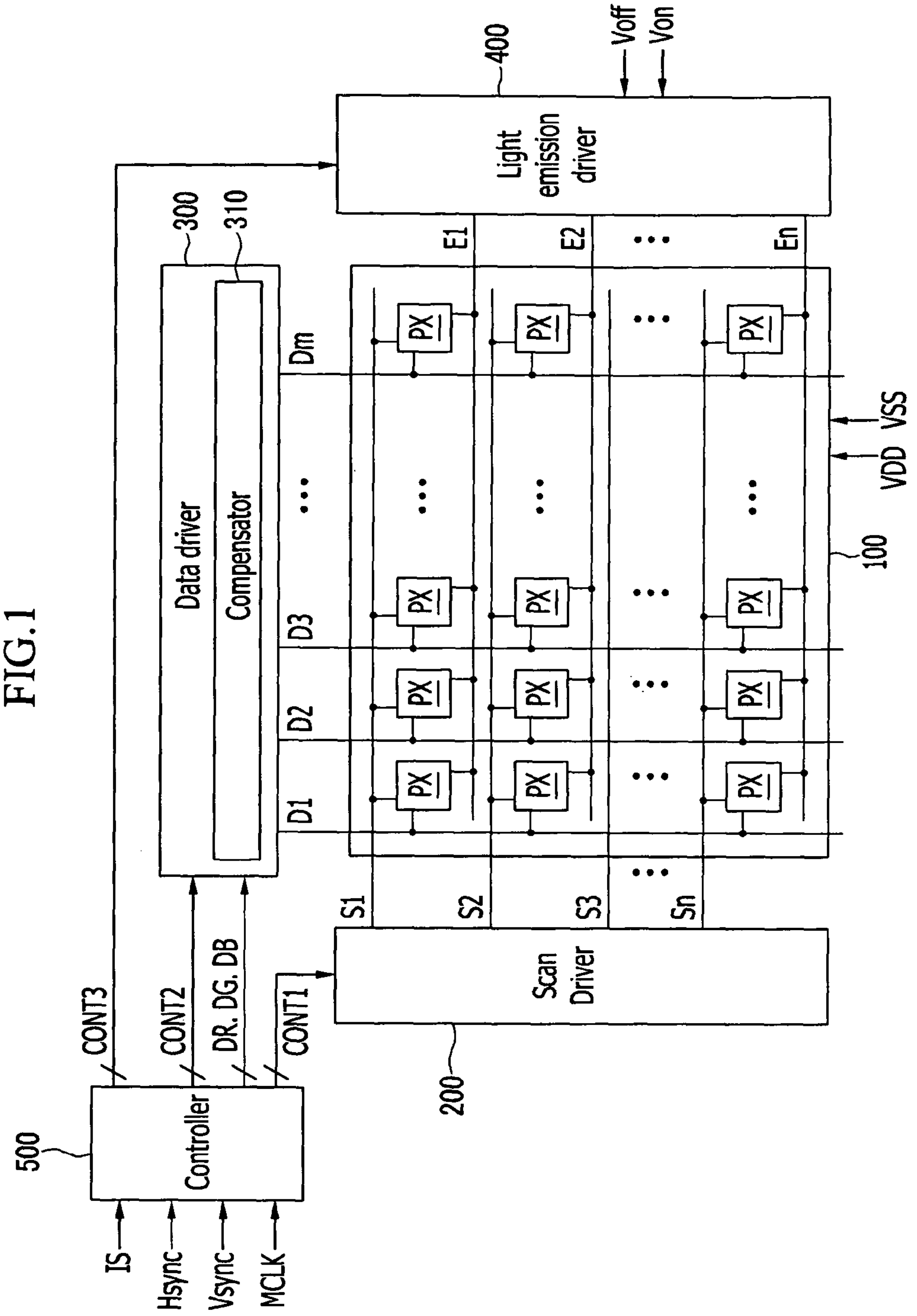
FIG. 1 illustrates a display device according to an exemplary embodiment.

Korean Patent Application No. 10-2010-0015379, filed on Feb. 19, 2010, in the Korean Intellectual Property Office, and entitled: "Display Device and Driving Method Thereof," is incorporated by reference herein in its entirety.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout this specification and the claims that follow, when it is described that an element is "coupled" to another element, the element may be "directly coupled" to the other element or "electrically coupled" to the other element through a third element. In addition, unless explicitly described to the contrary, the word "comprise" and variations such as "comprises" or "comprising" will be understood to imply the inclusion of stated elements but not the exclusion of any other elements.

FIG. 1 illustrates a display device according to an exemplary embodiment. Referring to FIG. 1, a display device according may include a display unit 100, a scan driver 200, a data driver 300, a light emission driver 400, and a controller 500.

The display unit 100 includes a plurality of signal lines S1-Sn, D1-Dm, and E1-En, and a plurality of pixels PX connected to the signal lines and arranged in a matrix format. The signal lines S1-Sn, D1-Dm, and E1-En include a plurality of scan lines S1-Sn transmitting scan signals SS1-SSn, a plurality of data lines D1-Dm transmitting a compensation data voltage Vdata_c, and a plurality of light emitting signal lines E1-En transmitting light emitting signals EM1-EMn. The scan lines S1-Sn and the light emitting signal lines E1-En extend substantially in a row direction and substantially parallel with each other, and the data lines D1-Dm extend substantially in a column direction and substantially parallel with each other.

The scan driver 200 is connected to the signal lines S1-Sn of the display unit 100, and sequentially applies the scan signals SS1-SSn to the scan lines S1-Sn according to a scan control signal CONT1. The plurality of scan signals SS1-SSn are formed of a combination of a scan ON voltage Von turning on a switching transistor M2 of each pixel PX (FIG. 2) and a scan OFF voltage turning off the switching transistor M2. If the switching transistor M2 is formed as a p-channel field effect transistor, the scan ON voltage is a low voltage and the scan OFF voltage is a high voltage.

The data driver 300 is connected to the data lines D1-Dm of the display unit 100, generates a data voltage Vdata corresponding to image data signals DR, DG, and DB input from the controller 500 according to a data control signal CONT2, converts the data voltage Vdata to a compensation data voltage Vdata_c compensated for a threshold voltage Vth of a driving transistor M1 of each pixel PX, and applies the compensation data voltage Vdata_c to the data lines D1-Dm.

The data driver 300 includes a compensator 310 that generates the compensation data voltage Vdata_c in accordance with a feedback voltage Vfb. The feedback voltage Vfb is determined by a voltage between an anode and a cathode of the organic light emitting diode OLED when a current $I_{OLED}$ flows thereto, and increases with an increasing deterioration degree of the organic light emitting diode OLED. The feedback voltage Vfb is used to compensate the data voltage Vdata The light emission driver 400 is connected to the light emitting signal lines E1-En of the display unit 100, and sequentially applies the plurality of light emitting signals EM1-EMn to the light emitting signal lines E1-En according to a light emission control signal CONT3. The plurality of light emitting signals EM1-EMn are formed of a combination of a gate ON voltage Von turning on a light emission control transistor M3 of each pixel PX and a gate OFF voltage turning off the light emission control transistor M3. If the light emission control transistor M3 is formed as a p-channel field effect transistor, the gate ON voltage Von and the gate OFF voltage Voff are respectively a low voltage and a high voltage.

The controller 500 receives an input signal IS, a horizontal synchronization signal Hsync, a vertical synchronization signal Vsync, and a main clock signal MCLK from an external source to generate the image data signals DR, DG, and DB, the scan control signal CONT1, the data control signal CONT2, and the light emission control signal CONT3. The scan control signal CONT1 includes a scan start signal STV that instructs the start of scanning and at least one clock signal controlling the scan start signal STV and an output cycle of the gate ON voltage. The scan control signal CONT1 may further include an output enable signal OE that limits the duration of the gate ON voltage Von. The data control signal CONT2 includes a horizontal synchronization start signal STH that informs the start of transmission of the image data signals DR, DG, and DB of pixels PX in one row to the data driver 300, and a load signal LOAD that instructs application of a compensation data voltage Vdata_c to the data lines D1-Dm.

The light emission control signal CONT3 includes a synchronization signal that instructs the start of scanning of the gate ON voltage Von with respect to the light emitting signal lines E1-En and at least one clock signal that controls an output of the gate ON voltage Von. The light emission control signal CONT3 may further include a signal that limits the duration of the gate ON voltage Von.

Figure 2:
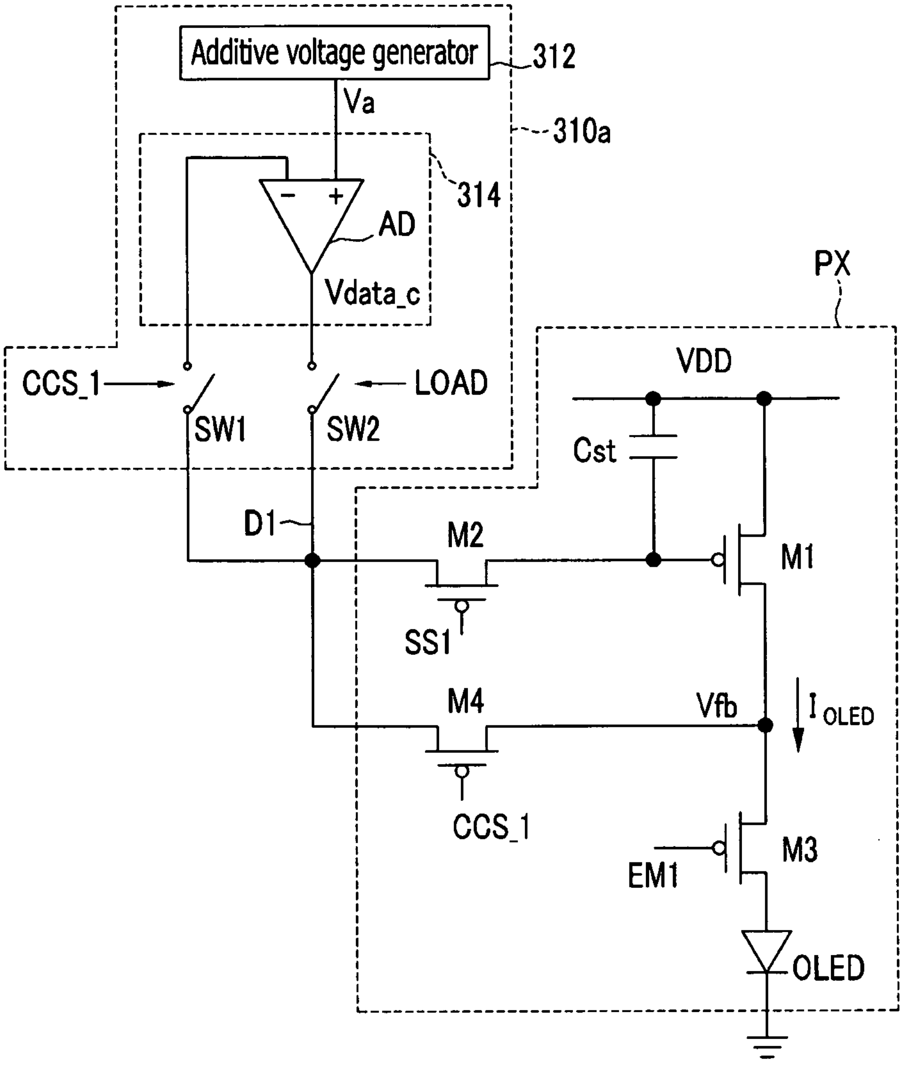
FIG. 2 illustrates an equivalent circuit diagram of a compensator and a pixel according to a first exemplary embodiment.

FIG. 2 illustrates an equivalent circuit diagram of a compensator 310*a* and the pixel PX according to a first exemplary embodiment. Referring to FIG. 2, the compensator 310*a* may include an additive voltage generator 312, a compensation data voltage generator 314, and switches SW1 and SW2. The pixel PX includes an organic light emitting diode OLED, a driving transistor M1, a capacitor Cst, the switching transistor M2, a light emission control transistor M3, and a threshold voltage compensation transistor M4.

The additive voltage Va is the sum of the data voltage Vdata and a predetermined power source voltage VDD. The compensator receives a feedback voltage Vfb corresponding to the threshold voltage Vth of the driving transistor M1 of each pixel PX according to a compensation control signal CCS_1, and generates a compensation data voltage Vdata_c corresponding to a voltage difference between the additive voltage Va and the feedback voltage Vfb. The data control signal CONT2 according to the first exemplary embodiment includes the compensation control signal CCS_1 for compensation of the threshold voltage Vth of the driving transistor M1 of each pixel PX. The compensation control signal CCS_1 includes a low-level pulse signal generated in synchronization with a low-level pulse of the scan signal.

While the compensator 310*a* illustrated in FIG. 2 includes one subtractor AD connected to the data line D1 for ease of explanation, multiple subtractors AD may be provided and respectively connected to the plurality of data lines D1-Dm. Each of the subtractors AD may sequentially receive a feedback voltage Vfb from the plurality of pixels PX respectively connected to the plurality of data lines D1-Dm. In addition, the pixel PX of FIG. 2 is an example of a pixel connected to the scan line S1 and the data line D1.

The additive voltage generator 312 receives the data voltage Vdata corresponding to the image data signals DR, DG, and DB, and adds the data voltage Vdata and the power source voltage VDD to generate the additive voltage Va.

The compensation data voltage generator 314 includes the subtractor AD. The subtractor AD receives the additive voltage Va through a non-inversion terminal (+) and receives the feedback voltage Vfb through an inversion terminal (−). The subtractor AD generates a compensation data voltage Vdata_c corresponding to a difference between the additive voltage Va and the feedback voltage Vfb.

The switch SW1 includes a first end connected to the inversion terminal (−) of the subtractor AD and a second end connected to a source terminal of the switching transistor M2 of the pixel PX. The switch SW1 is turned on/off according to the compensation control signal CCS_1. The switch SW2 includes a first end connected to an output terminal of the subtractor AD and a second end connected to the source terminal of the switching transistor M2 of the pixel PX. The switch SW2 is turned on/off according to the load signal LOAD.

For example, the switch SW 1 is turned on when the compensation control signal CCS_1 is low and turned off when the compensation control signal CCS_1 is high. In addition, the switch SW2 is turned on when the load signal LOAD is low and turned off when the load signal LOAD is high.

The driving transistor M1 of the pixel PX includes a source terminal receiving the power source voltage VDD and a drain terminal connected to a source terminal of the light emitting transistor M3. The switching transistor M2 includes a gate terminal receiving the scan signal SS1, a drain terminal connected to the source terminal of the driving transistor M1, and a source terminal connected to the data line D1. The capacitor Cst is connected between the source terminal and the gate terminal of the driving transistor M1. The capacitor Cst charges a data voltage applied to the gate terminal of the driving transistor M1 and maintains the charge of the data voltage when the switching transistor M2 is turned off.

The light emission control transistor M3 of the pixel PX includes a gate terminal receiving a light emitting signal EM1 and a drain terminal connected to an anode of the organic light emitting diode OLED. The light emission control transistor M3 is selectively turned on according to the light emitting signal EM1 to supply a current $I_{OLED}$ flowing in the driving transistor M1 to the organic light emitting diode OLED.

The threshold voltage compensation transistor M4 of the pixel PX includes a gate terminal receiving the compensation control signal CCS_1, a drain terminal connected to the drain terminal of the driving transistor M1, and a source terminal connected to the source terminal of the switching transistor M2. The threshold voltage compensation transistor M4 is selectively turned on by the compensation control signal CCS_1 to transmit the feedback voltage Vfb at the drain terminal of the driving transistor M1 to the compensator 310*a* when the driving transistor M1 is diode-connected. That is, the feedback voltage Vfb corresponds to a voltage difference between the power source voltage VDD and the threshold voltage Vth of the driving transistor M1.

The organic light emitting diode OLED of the pixel PX includes a cathode receiving the power source voltage VDD. The intensity of light emitted from the organic light emitting diode OLED varies depending upon the current $I_{OLED}$ supplied from the driving transistor M1 through the light emission control transistor M3 so as to display an image.

The organic light emitting diode OLED may emit light of one of primary colors. The primary colors may be three primary colors, e.g., red, green, and blue, and a desired color may be expressed by a spatial or temporal sum of the three primary colors. Some of the organic light emitting elements OLED may emit white light to increase luminance. Alternatively, the organic light emitting elements OLED at all of the pixels PX may emit white light. In this case, some of the pixels PX may further include a color filter (not shown) for converting the white light output from the organic light emitting element OLED into any one of the primary colors.

The driving transistor M1, the switching transistor M2, the light emission control transistor M3, and the threshold voltage compensation transistor M4 are illustrated in FIG. 2 as all being p-channel field effect transistors (FET). However, at least one of the driving transistor M1, the switching transistor M2, the light emission control transistor M3, and the threshold voltage compensation transistor M4 may be an n-channel FET. In addition, interconnections between the driving transistor M1, the switching transistor M2, the light emission control transistor M3, the threshold voltage compensation transistor M4, the capacitor Cst, and the organic light emitting diode OLED may be changed. The pixel PX shown in FIG. 2 is merely an example, and pixels having a different structure may be used instead.

Figure 3:
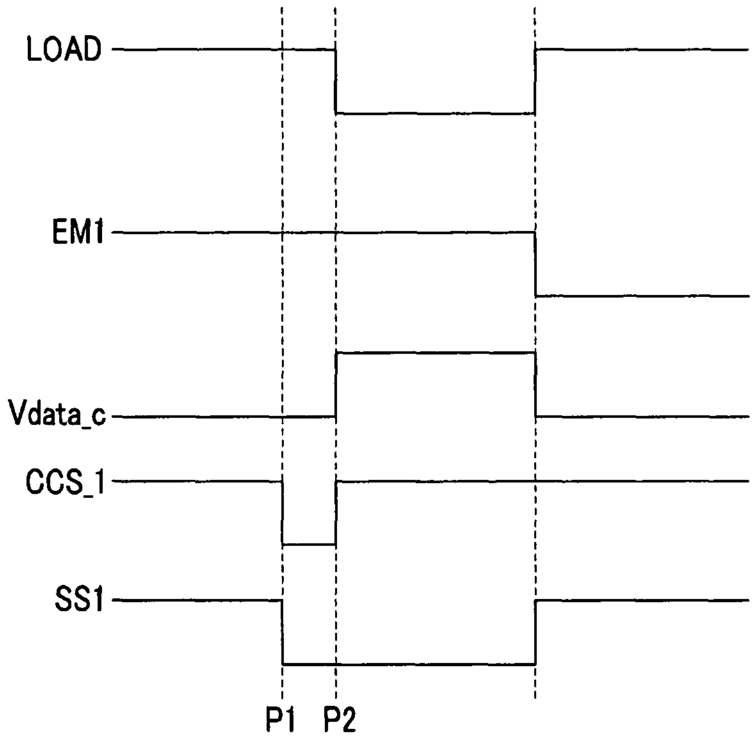
FIG. 3 illustrates a waveform diagram of a driving method of the display device according to the first exemplary embodiment.

FIG. 3 illustrates a waveform diagram of a driving method of the display device according to the first exemplary embodiment. Referring to FIG. 3, the image data signals DR, DG, and DB are transmitted, and the data driver 300 generates the data voltage Vdata corresponding to the image data signals DR, DG, and DB.

The additive voltage generator 312 generates the additive voltage Va by adding the power source voltage VDD to the data voltage Vdata. The additive voltage Va is transmitted to the non-inversion terminal (+) of the subtractor AD. In this state, when the scan signal SS1 becomes low at a time point P1, the compensation control signal CCS_1 becomes low. Then, the switching transistor M2 is turned on by the scan signal SS1 and the threshold voltage compensation transistor M4 is turned on by the compensation control signal CCS_1. Thus, the gate terminal and the drain terminal of the driving transistor M1 are connected. Accordingly, a feedback voltage Vfb is generated at the drain terminal of the driving transistor M1. In this case, the feedback voltage Vfb corresponds to a voltage obtained by subtracting the threshold voltage Vth of the driving transistor M1 from the power source voltage VDD. Since the switch SW1 is in the turn-on state by the compensation control signal CCS_1, the feedback voltage Vfb is transmitted to the inversion terminal (−) of the subtractor AD. The subtractor AD subtracts the feedback voltage Vfb from the additive voltage Va to output the compensation data voltage Vdata_c. The compensation data voltage Vdata_c is obtained as given in Equation 1.

$$V\text{data\_}c = Va - V\text{fb} = (VDD + V\text{data}) - (VDD - V\text{th}) = V\text{data} + V\text{th} \quad \text{(Equation 1)}$$

That is, the compensation data voltage Vdata_c equals the sum of the data voltage Vdata and the threshold voltage Vth of the driving transistor M1. At a time point P2, the load signal LOAD becomes low and then the switch SW2 is turned on. Since the switching transistor M2 is turned-on, the compensation data voltage Vdata_c is transmitted to the gate terminal of the driving transistor M1 through the switching transistor M2. Here, the current $I_{OLED}$ flowing in the driving transistor M1 is defined as given in Equation 2.

$$I_{OLED} = k*(Vgs - V\text{th})^2 \quad \text{(Equation 2)}$$

Here, Vgs denotes a voltage difference between the voltage at the gate terminal and the voltage at the source terminal of the driving transistor M1, and equals (Vdata+Vth)−VDD when Equation 1 is used, and k is a constant. When this value is applied to Equation 2, the current $I_{OLED}$ flowing in the driving transistor M1 is as given in Equation 3.

$$I_{OLED} = k*(V\text{data} - VDD)^2 \quad \text{(Equation 3)}$$

This means that the current $I_{OLED}$ flowing in the driving transistor M1 is not influenced by the threshold voltage Vth. Accordingly, variation of the intensity of the current $I_{OLED}$ flowing to the driving transistor M1 due to the threshold voltage Vth can be prevented. That is, luminance of the organic light emitting diode OLED may be constantly maintained by offsetting the threshold voltage Vth of the driving transistor M1 according to the first exemplary embodiment.

Figure 4:
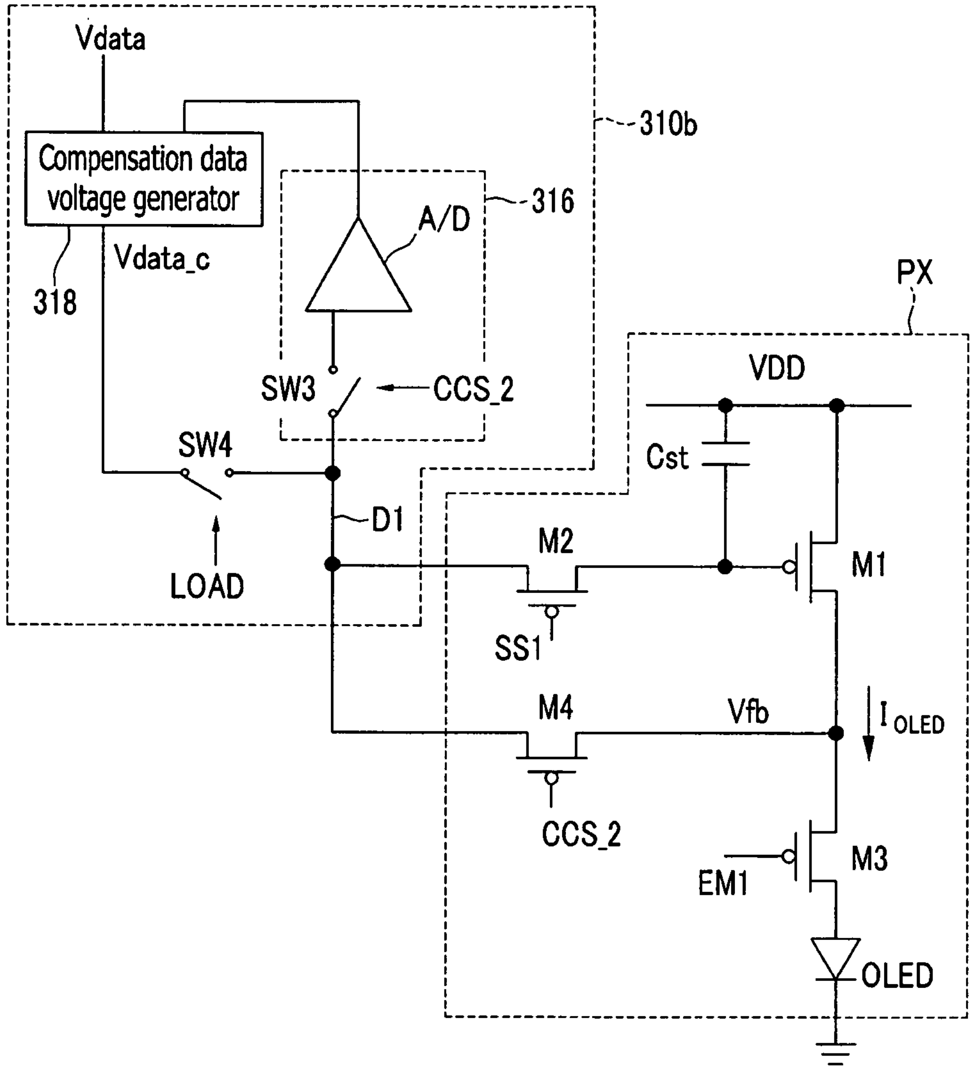
FIG. 4 illustrates an equivalent circuit diagram of a compensator and a pixel according to a second exemplary embodiment.

FIG. 4 illustrates an equivalent circuit diagram of a compensator 310*b* and the pixel PX according to a second exemplary embodiment of the present invention. The pixel PX in FIG. 4 is the same as the pixel PX in FIG. 2, and the description will not be repeated. However, unlike the threshold voltage compensation transistor M4 of FIG. 2, a threshold voltage compensation transistor M4 in FIG. 4 is selectively turned on by a compensation control signal CCS_2 instead of a compensation control signal CSS_1. The compensation control signal CCS_2 according to the second exemplary embodiment includes a low-level pulse signal generated from the scan signal with a predetermined phase delay, e.g., a delay equal to one scan pulse. Referring to FIG. 4, the compensator 310*b* according to the second exemplary embodiment includes a deterioration detector 316, a compensation data voltage generator 318, and a switch SW4.

The deterioration detector 316 transmits a feedback voltage Vfb that corresponds to the deterioration degree of an organic light emitting diode OLED to the compensation data voltage generator 318 according to the compensation control signal CCS_2. The feedback voltage Vfb according to the second exemplary embodiment is determined by a voltage between an anode and a cathode of the organic light emitting diode OLED when a current $I_{OLED}$ flows thereto, and increases as the deterioration degree of the organic light emitting diode OLED increases.

The deterioration detector 316 includes an analog digital converter A/D and a switch SW3. The analog digital converter A/D transmits the feedback voltage Vfb to the compensation data voltage generator 318. The switch SW3 includes a first end connected to the analog digital converter A/D and a second end connected to a source of the switching transistor M2, and is turned on/off according to the compensation control signal CCS_2. For example, the switch SW3 according to the second exemplary embodiment is turned on when the compensation control signal CCS_2 is low and turned off when the compensation control signal CCS_2 is high. Here, the compensation control signal CCS_2 according to the second exemplary embodiment of the present invention includes a low-level pulse signal generated from the scan signal with a predetermined phase delay.

The compensation data voltage generator 318 calculates the variation amount of the feedback voltage Vfb detected from the deterioration detector 316 and generates the compensation data voltage Vdata_c by compensating a data voltage Vdata as much as the varied amount of the feedback voltage Vfb. The compensation data voltage generator 318 compensates the data voltage Vdata depending on the variation of the feedback voltage Vfb to generate the compensation data voltage Vdata_c. The compensation data voltage generator 318 determines the degree of compensation of the data voltage Vdata according to the variation of the feedback voltage Vfb. In this case, the relationship between the variation of the feedback voltage Vfb and the degree of the compensation of the data voltage Vdata may be stored in a lookup table acquired through experimental methods.

In further detail, since an increase of the feedback voltage Vfb implies deterioration of the organic light emitting diode OLED, much more current should flow in the organic light emitting diode OLED for light emission with luminance set in the initial state. In addition, when the driving transistor M1 is a P-type transistor, deterioration of the organic light emitting diode OLED may be compensated by appropriately decreasing the data voltage Vdata. In this case, the lookup table stores the degree of compensation of the data voltage Vdata according to the variation of the feedback voltage Vfb. The variation of the feedback voltage Vfb implies a difference between a previously measured feedback voltage Vfb and a current feedback voltage Vfb when the feedback voltage Vfb generated according to the current flowing in the organic light emitting diode OLED is measured with a predetermined time gap.

The switch SW4 includes a first end connected to the compensation data voltage generator 318 and a second end connected to the data line D1. The switch SW4 is turned on/off according to the load signal LOAD. For example, the switch SW4 of the present exemplary embodiment is turned on when the load signal LOAD is low and turned off when the load signal LOAD is high.

Figure 5:
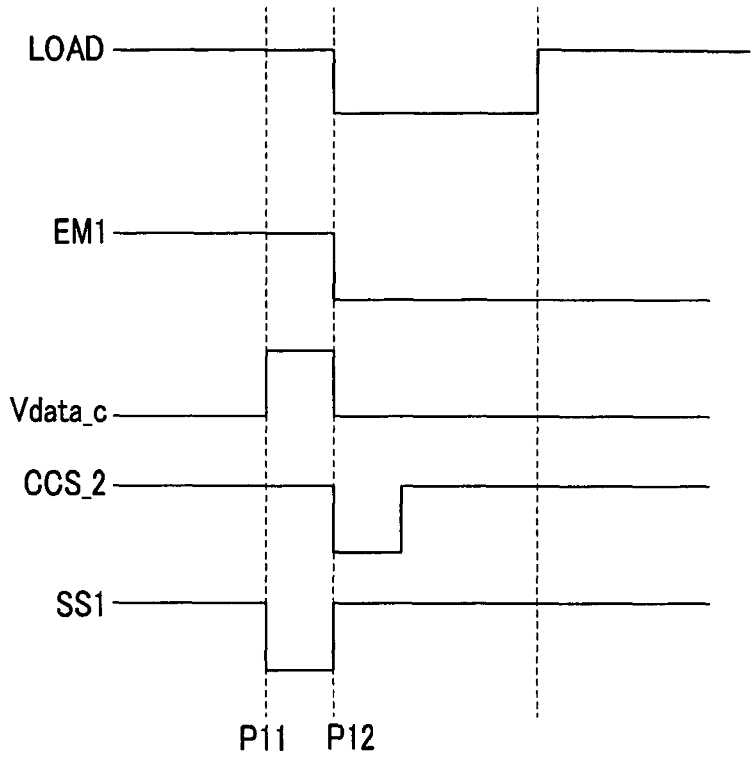
FIG. 5 illustrates a waveform diagram of a driving method of a display device according to the second exemplary embodiment.

FIG. 5 illustrates a waveform diagram of a driving method of the display device according to the second exemplary embodiment. Referring to FIG. 5, when image data signals DR, DG, and DB are transmitted, the data driver 300 generates a data voltage Vdata corresponding to the image data signals DR, DG, and DB.

When the scan signal SS1 becomes low at a time point P11, the switching transistor M2 is turned on and the data voltage Vdata is transmitted to a gate terminal of the driving transistor M1. When the scan signal SS1 becomes high at a time point P12, the switching transistor M2 is turned off and the light emission control signal EM1 becomes low. Then, the light emission control transistor M3 is turned on and a current $I_{OLED}$ flows in the driving transistor M1.

The current $I_{OLED}$ is supplied to the organic light emitting diode OLED through the light emission control transistor M3 such that the organic light emitting diode OLED emits light. In this case, the feedback voltage Vfb at both sides of the organic light emitting diode OLED varies according to the degree of deterioration of the organic light emitting diode OLED. The feedback voltage Vfb is increased as the degree of the deterioration of the organic light emitting diode OLED is increased.

When the compensation control signal CSS_2 becomes low at the time point P12, the threshold voltage compensation transistor M4 and the switch SW3 are turned on. Then, the feedback voltage Vfb is transmitted to the analog digital converter A/D. The feedback voltage Vfb transmitted through the analog digital converter A/D is transmitted to the compensation data voltage generator 318. The compensation data voltage generator 318 calculates the variation amount of the feedback voltage Vfb, and compensates the data voltage Vdata according to the calculated variation amount to generate the compensation data voltage Vdata_c. That is, luminance of the organic light emitting diode OLED may be constantly maintained by detecting and compensating deterioration of the organic light emitting diode OLED according to the second exemplary embodiment.

DESCRIPTION OF SYMBOLS

Display unit 100, scan driver 200, data driver 300, controller 400, light emission driver 400, scan lines S1-Sn, data lines D1-Dm, scan signals SS1-SSn, switching transistor M2, pixel PX, light emitting signal lines E1-En, light emitting signals EM1-EMn, input signal IS, horizontal synchronization signal Hsync, vertical synchronization signal Vsync, main clock signal MCLK, image data signals DR, DG, DB, gate ON voltage Von, scan control signal CONT1, data control signal CONT2, light emission control signal CONT3, compensators 310, 310*a*, 310*b*, subtractor AD, additive voltage generator 312, gate OFF voltage Voff, compensation data voltage generator 314, deterioration detector 316, compensation data voltage generator 318, switches SW1, SW2, SW3, SW4, analog digital converter A/D, driving transistor M1, light emission control transistor M3, threshold voltage compensation transistor M4, capacitor CST, organic light emitting diode OLED.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A display device, comprising:

a display unit including a plurality of scan lines to which a plurality of scan signals are transmitted, a plurality of data lines to which a plurality of compensation data signals are transmitted, a plurality of light emitting signal lines to which a plurality of light emitting signals are transmitted, and a plurality of pixels respectively connected to the plurality of scan lines, the plurality of data lines, the plurality of light emitting signal lines, and a first power source voltage; and a data driver configured to generate a data voltage corresponding to an image data signal and to convert the data voltage into a compensation data signal, wherein the data driver includes a compensator configured to generate an additive voltage by adding the first power source voltage to the data voltage, to receive a feedback voltage corresponding to a threshold voltage of a driving transistor of each pixel according to a compensation control signal generated in synchronization with the scan signal, the feedback voltage corresponding to a voltage difference between the first power source voltage and the threshold voltage of the driving transistor, and to generate a difference between the additive voltage and the feedback voltage as the compensation data signal.

2. The display device as claimed in claim 1, wherein the compensator comprises:

an additive voltage generator configured to generate the additive voltage by adding the data voltage and the first power source voltage;

a compensation data voltage generator configured to generate the compensation data signal by subtracting feedback voltage from the additive voltage;

a first switch transmitting the feedback voltage to the compensation data voltage generator according to the compensation control signal; and a second switch transmitting the compensation data signal to the pixel according to a load signal that instructs transmission of the compensation data signal to the plurality of data lines.

3. The display device as claimed in claim 2, wherein the compensation data voltage generator comprises a non-inversion terminal receiving the additive voltage, an inversion terminal receiving the feedback voltage, and an output terminal connected to the data line.

4. The display device as claimed in claim 2, wherein each of the plurality of pixels comprises:

a switching transistor having a source terminal connected to the data line and a gate line connected to the scan line;

a driving transistor having a source terminal receiving the first power source voltage and a gate terminal connected to a drain terminal of the switching transistor;

a capacitor having a first end connected to the source terminal of the driving transistor and a second end connected to the gate terminal of the driving transistor;

a light emission control transistor having a gate terminal connected to the light emitting signal line and a source terminal connected to the drain of the driving transistor;

an organic light emitting diode (OLED) having an anode connected to the drain terminal of the light emission control transistor and a cathode receiving a second power source voltage; and a threshold voltage compensation transistor having a gate terminal receiving the compensation control signal, a drain terminal connected to the drain terminal of the driving transistor, and a source terminal connected to the source terminal of the switching transistor.

5. A driving method of a display device including a plurality of scan lines to which a plurality of scan signals are transmitted, a plurality of data lines to which a plurality of compensation data signals are transmitted, a plurality of light emitting signal lines to which a plurality of light emitting signals are transmitted, and a plurality of pixels respectively connected to the plurality of scan lines, the plurality of data lines, the plurality of light emitting signal lines, and a first power source voltage, the driving method comprising:

generating a data voltage corresponding to an image data signal;

generating an additive voltage by adding the first power source voltage to the data voltage;

receiving a feedback voltage corresponding to a threshold voltage of a driving transistor of each of the plurality of pixels according to a compensation control signal generated by synchronization with the scan signal, the feedback voltage corresponding to a voltage difference between the first power source voltage and the threshold voltage of the driving transistor; and generating a difference between the additive voltage and the feedback voltage and transmitting the difference as a compensation data signal to the plurality of data lines.

6. The driving method as claimed in claim 5, wherein the feedback voltage equals a difference between the power source voltage and the threshold voltage of the driving transistor.

7. The driving method as claimed in claim 5, wherein transmitting the compensation data signal to the pixel is in accordance with a load signal that instructs transmission of the compensation data signal to the plurality of data lines.

* * * * *